US010069650B2

(12) United States Patent
Munoz et al.

(10) Patent No.: US 10,069,650 B2
(45) Date of Patent: Sep. 4, 2018

(54) ETHERNET AND OFDM MULTIPLEXING ON UTP CABLE

(71) Applicant: Marvell World Trade Ltd., St. Michael (BB)

(72) Inventors: David Terol Munoz, Betera (ES); Antonio Jiminez De Parga Bernal, Rocafort (ES); Jose Luis Gonzalez Moreno, Xirivella (ES)

(73) Assignee: Marvell World Trade Ltd., St. Michael (BB)

( * ) Notice: Subject to any disclaimer, the term of this patent is extended or adjusted under 35 U.S.C. 154(b) by 99 days.

(21) Appl. No.: 15/236,252

(22) Filed: Aug. 12, 2016

(65) Prior Publication Data

US 2017/0048085 A1    Feb. 16, 2017

Related U.S. Application Data

(60) Provisional application No. 62/204,580, filed on Aug. 13, 2015.

(51) Int. Cl.
*H04L 12/64* (2006.01)
*H04L 5/00* (2006.01)
(Continued)

(52) U.S. Cl.
CPC ......... *H04L 12/6418* (2013.01); *H04B 3/00* (2013.01); *H04L 5/0007* (2013.01); *H04L 12/00* (2013.01);
(Continued)

(58) Field of Classification Search
CPC . H04L 12/6418; H04L 49/351; H04L 5/0007; H04L 69/28
See application file for complete search history.

(56) References Cited

U.S. PATENT DOCUMENTS 8,995,247 B2 * 3/2015 Chappel .............. H04L 27/2605
340/502
9,166,860 B2 * 10/2015 Kim ..................... H04L 29/02
(Continued)

OTHER PUBLICATIONS

International Application No. PCT/IB2016/054879, Notification of Transmittal of the International Search Report and the Written Opinion of the International Searching Authority, dated Nov. 11, 2016, 11 pages.
(Continued)

*Primary Examiner* — Rasheed Gidado

(57) ABSTRACT

Systems, devices, and techniques relating to network upgrade and protocol selection in wireline communication networks are described. A described network device includes ports to connect with destination devices over wireline transmission mediums, wireline transmission mediums respectively comprising at least one pair of wires for transmitting and receiving data; a packet processor configured to forward packets to and from the ports; first transceiver circuitry configured to communicate using an Ethernet protocol over at least a portion of the wireline transmission mediums; second transceiver circuitry configured to communicate using an OFDM broadband protocol over at least a portion of the wireline transmission mediums; and a controller. The controller is configured to determine a protocol used by a destination device connected with the network device, and for communications with the respective destination device, select among the first transceiver circuitry and the second transceiver circuitry based on the protocol used by the destination device.

21 Claims, 7 Drawing Sheets

(51) Int. Cl.
*H04L 12/931* (2013.01)
*H04L 29/06* (2006.01)
*H04B 3/00* (2006.01)
*H04L 12/00* (2006.01)
*H04L 29/00* (2006.01)

(52) U.S. Cl.
CPC ............ *H04L 29/00* (2013.01); *H04L 49/351* (2013.01); *H04L 69/28* (2013.01)

(56) References Cited

U.S. PATENT DOCUMENTS

| | | | |
|---|---|---|---|
| 9,271,153 B2* | 2/2016 | Ho | H04W 16/10 |
| 9,306,624 B1* | 4/2016 | Wolter | H04B 3/54 |
| 9,774,415 B2* | 9/2017 | Hassan | H04J 11/003 |
| 2006/0194575 A1* | 8/2006 | Stadelmeier | H04L 12/2803 |
| | | | 455/426.1 |
| 2012/0057483 A1* | 3/2012 | Kim | H04B 3/542 |
| | | | 370/252 |

OTHER PUBLICATIONS

Rak, "Powerline Module—LX200V20", LX200V20 Homeplug AV Powerline Module, Version V1.2, Jul. 13, 2014, XP055315068, retrieved from the Internet Oct. 31, 2016: https://www.bluerobotics.com/downloads/LX200V20-Datasheet-v1.2.pdf.

* cited by examiner

ETHERNET AND OFDM MULTIPLEXING ON UTP CABLE

CROSS REFERENCE TO RELATED APPLICATIONS

This present disclosure claims the benefit of the priority of U.S. Provisional Application Ser. No. 62/204,580, filed Aug. 13, 2015, and entitled "Ethernet and OFDM Multiplexing on UTP Cable." The application identified above is incorporated herein by reference in its entirety.

BACKGROUND

This disclosure relates to network upgrade and protocol selection techniques for wireline communication systems.

Wireline communication systems, in some implementations, include one or more protocols for communications. For example, in some implementations, a wireline system supports one or more variants of an Ethernet protocol such as Ethernet over copper (EoC) at 100BASE-T or 1000BASE-T. In another example, in some implementations, a wireline system supports an Orthogonal Frequency Division Multiplexing (OFDM) broadband protocol such as one based on G.hn or ITU-T standard. These and other wireline systems, in some implementations, communicate via a twisted pair of wires that are bundled in an Unshielded Twisted Pair (UTP) cable. A device transmits and receives data on each of the wire pairs. Further, a wireline protocol, in some implementations, concurrently uses two or more twisted pairs of wires for a multiple-input, multiple-output (MIMO) style communication.

SUMMARY

The present disclosure includes systems and techniques for network upgrade and protocol selection in wireline communication networks. According to an aspect of the present disclosure, a network device includes ports to connect with destination devices over wireline transmission mediums, wireline transmission mediums respectively comprising at least one pair of wires for transmitting and receiving data; a packet processor configured to forward packets to and from the ports; first transceiver circuitry configured to communicate using an Ethernet protocol over at least a portion of the wireline transmission mediums; second transceiver circuitry configured to communicate using an OFDM broadband protocol over at least a portion of the wireline transmission mediums; and a controller. The controller is configured to determine a protocol used by a respective destination device of the destination devices connected with the network device over a respective wireline transmission medium of the wireline transmission mediums, and for communications with the respective destination device, select among the first transceiver circuitry and the second transceiver circuitry based on the protocol used by the respective destination device.

This and other implementations can include one or more of the following features. Implementations can include a transformer coupled with a respective port of the ports, the transformer being configured to transform incoming and outgoing signals for a first transceiver of the first transceiver circuitry and a second transceiver of the second transceiver circuitry; and a multiplexer coupled with the first transceiver, the second transceiver, and the transformer, where the controller causes the multiplexer to select between the first transceiver and the second transceiver based on the protocol used by the respective destination device for communications via the respective port. Implementations can include a transformer coupled with a respective port of the ports, the transformer being configured to transform incoming and outgoing signals for a first transceiver of the first transceiver circuitry and a second transceiver of the second transceiver circuitry; and a switch coupled between the first transceiver and the transformer, the second transceiver being coupled between the switch and the transformer, and the controller being configured to cause the switch to isolate the first transceiver from the transformer if the second transceiver is selected to communicate with the respective destination device.

In some implementations, the ports respectively include a connector to receive an Unshielded Twisted Pair (UTP) cable. In some implementations, the first transceiver circuitry includes one or more first transceivers. In some implementations, the second transceiver circuitry includes one or more second transceivers. In some implementations, the respective wireline transmission medium includes two or more pairs of wires, the first transceiver circuitry includes two or more first transceivers configured to communicate respectively via the two or more pairs of wires of the respective wireline transmission medium, and the second transceiver circuitry includes two or more second transceivers configured to communicate respectively via the two or more pairs of wires of the respective wireline transmission medium. Implementations can include a connector to receive an UTP cable, where at least a portion of the two or more pairs of wires are bundled in the UTP cable. In some implementations, the controller is configured to detect a number of pairs of wires that are used by the respective destination device and to determine the protocol used by the respective destination device based on the number.

In some implementations, the controller is configured to determine the protocol used by the respective destination device by causing the first transceiver circuitry to attempt to communicate with the respective destination device via the Ethernet protocol for a first predetermined amount of time and subsequently use the Ethernet protocol if an Ethernet negotiation was successful during the first predetermined amount of time. In some implementations, the controller is configured to determine the protocol used by the respective destination device by causing the second transceiver circuitry to attempt to communicate with the respective destination device via the OFDM broadband protocol for a second predetermined amount of time and subsequently use the OFDM broadband protocol if a negotiation was successful during the second predetermined amount of time. In some implementations, the controller is configured to cause at least a portion of the first transceiver circuitry to enter a power down mode if the second transceiver circuitry is selected to communicate with the respective destination device via the respective wireline transmission medium. In some implementations, the controller is configured to cause at least a portion of the second transceiver circuitry to enter a high impedance state if the first transceiver circuitry is selected to communicate via the respective wireline transmission medium.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a router, a switch, a computer system component, a medium access unit), a general purpose data processing apparatus such as a computer, or combinations of these.

A network technique, in some implementations, includes causing a packet processor of a network device to forward packets to and from ports of the network device, the ports being connectable with destination devices over wireline transmission mediums, the wireline transmission mediums respectively including at least one pair of wires for transmitting and receiving data. The technique includes operating first transceiver circuitry of the network device to communicate using an Ethernet protocol over at least a portion of the wireline transmission mediums and second transceiver circuitry of the network device to communicate using an OFDM broadband protocol over at least a portion of the wireline transmission mediums. The technique includes determining, from a group of wireline communication protocols, a protocol used by a respective destination device of the destination devices connected with the network device over a respective wireline transmission medium of the wireline transmission mediums, the group of communication protocols including an Ethernet protocol and an OFDM broadband protocol. The technique includes selecting among the first transceiver circuitry and the second transceiver circuitry based on the protocol used by the respective destination device for communications with the respective destination device.

This and other implementations can include one or more of the following features. Implementations can include operating an interface that includes a respective port of the ports, a first transceiver of the first transceiver circuitry, a second transceiver of the second transceiver circuitry, a transformer that is coupled with the respective port, and a multiplexer coupled with the first transceiver, the second transceiver, and the transformer, where the transformer is configured to transform incoming and outgoing signals for the first transceiver and the second transceiver, and where operating the interface includes causing the multiplexer to select between the first transceiver and the second transceiver based on the protocol used by the respective destination device. Implementations can include operating an interface that includes a respective port of the ports, a first transceiver of the first transceiver circuitry, a second transceiver of the second transceiver circuitry, a transformer that is coupled with the respective port, and a switch coupled between the first transceiver and the transformer, where the second transceiver is coupled between the switch and the transformer, where the transformer is configured to transform incoming and outgoing signals for the first transceiver and the second transceiver, and where operating the interface includes causing the switch to isolate the first transceiver from the transformer if the second transceiver is selected to communicate with the respective destination device.

In some implementations, the respective wireline transmission medium includes two or more pairs of wires, where the first transceiver circuitry includes two or more first transceivers configured to communicate respectively via the two or more pairs of wires of the respective wireline transmission medium, where the second transceiver circuitry includes two or more second transceivers configured to communicate respectively via the two or more pairs of wires of the respective wireline transmission medium, where the method includes using the two or more pairs of wires to communicate with the respective destination device. In some implementations, determining the protocol includes detecting a number of pairs of wires that are used by the respective destination device, and determining the protocol used by the respective destination device based on the number.

In some implementations, determining the protocol includes causing the first transceiver circuitry to attempt to communicate with the respective destination device via the Ethernet protocol for a first predetermined amount of time, and determining a success of an Ethernet negotiation during the first predetermined amount of time. In some implementations, determining the protocol includes causing the second transceiver circuitry to attempt to communicate with the respective destination device via the OFDM broadband protocol for a second predetermined amount of time; and determining a success of a negotiation during the second predetermined amount of time. Some implementations can include selectively causing at least a portion of the first transceiver circuitry to enter a power down mode if the second transceiver circuitry is selected to communicate with the respective destination device via the respective wireline transmission medium, and selectively causing at least a portion of the second transceiver circuitry to enter a high impedance state if the first transceiver circuitry is selected to communicate via the respective wireline transmission medium.

A technique for upgrading a network to support at least two different wireline communication protocols, in some implementations, includes communicatively coupling a network device to two or more destination devices that are respectively configured to communicate using at least an Ethernet communication protocol or a non-Ethernet communication protocol; determining, at the network device, from a group of wireline communication protocols a first communication protocol used by a first destination device connected to the network device over a first pair of wires, where the group of communication protocols includes the Ethernet communication protocol and the non-Ethernet communication protocol, where the first communication protocol is the Ethernet communication protocol; determining, at the network device, from the group of wireline communication protocols a second communication protocol used by a second destination device connected to the network device over a second pair of wires, where the second communication protocol is the non-Ethernet communication protocol; selecting first transceiver circuitry of the network device to communicate with the first destination device using the first communication protocol over the first pair of wires; selecting second transceiver circuitry of the network device to communicate with the second destination device using the second communication protocol over the second pair of wires; receiving, at the network device, flows of packet data communications traffic respectively for the first destination device and the second destination device; and forwarding packets of the flows to the first destination device and the second destination device respectively using the selected first transceiver circuitry and the selected second transceiver circuitry. In some implementations, the first pair of wires are bundled in a first UTP cable; the second pair of wires are bundled in a second UTP cable; and forwarding the packets includes transmitting a first packet of the packets to the first destination device via the first UTP cable, and transmitting a second packet of the packets to the second destination device via the second UTP cable. In some implementations, the first pair of wires are bundled in a UTP cable; the second pair of wires are bundled in the UTP cable; and forwarding the packets includes transmitting a first packet of the packets to the first destination device via the first pair of wires in the UTP cable, and transmitting a second packet of the packets to the second destination device via the second pair of wires in the UTP cable.

Particular configurations of the technology described in this disclosure can be implemented so as to realize one or more of the following potential advantages. A described technique can allow flexibility when introducing newer and faster wireline protocols within a metropolitan area. A described network device can support multiple protocols for each customer endpoint. Multiplexing Ethernet and G.hn in the same device may allow a smooth and seamless transition from 100 Mbps or 1 Gbps Ethernet to 2 Gbps G.hn. For example, a described technology can provide backwards compatibility to 100BASE-T customers using a single system which allows an operator to replace, with little or no disruption, the whole legacy Ethernet switch with a new system which is using 100BASE-T with legacy customers and G.hn with new customers requiring at least 1 Gbps service. To support multiple protocols, a described network device can share circuitry such as an Ethernet transformer to reduce cost.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
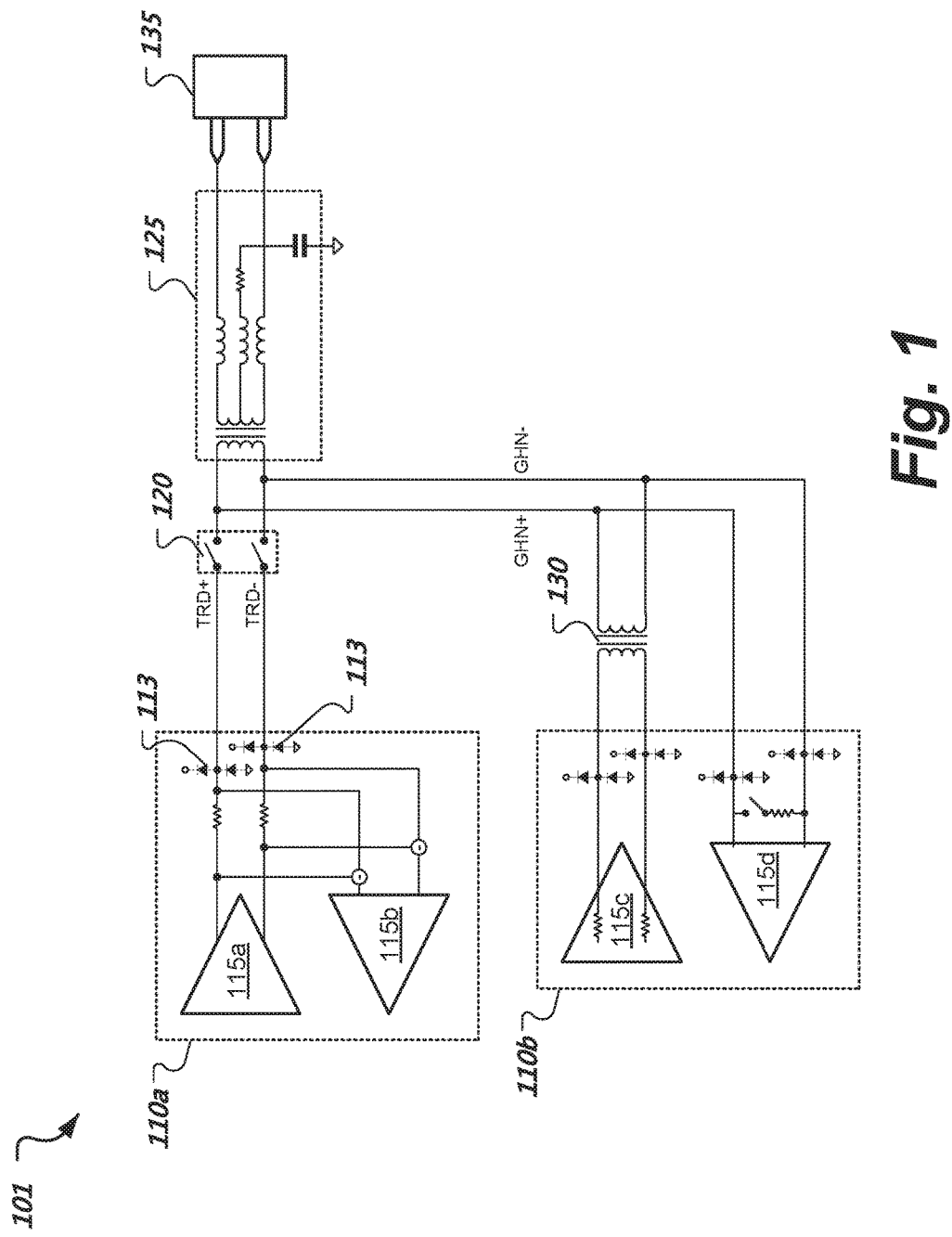
FIG. 1 shows a block-level diagram of an example of a multi-protocol interface of a network device for communications over a single wire pair.

Some countries have a large metro-Ethernet infrastructure using two unshielded twisted pairs to deliver a 100 Mbps bandwidth. Proprietary Ethernet protocols have arisen providing 500 Mbps or 1 Gbps over two pairs, up to 100 m, in order to reuse existing cabling. The same appears when upgrading a 1000BASE-T Gigabit Ethernet backbone for enterprise wireless (WiFi) access points to 2 Gbps and beyond. A newer non-Ethernet protocol such as G.hn protocol provides up to 2 Gbps bandwidth using one pair or two wire pairs, without any significant operational limit in distance. By multiplexing Ethernet and G.hn in the same network device and/or over shared wired communication infrastructure, a smooth and seamless transition from 100 Mbps or 1 Gbps Ethernet to 2 Gbps G.hn is obtainable. Thus, legacy Ethernet switches are replaced with a network device, in an embodiment of the disclosure described below, to maintain the Ethernet service continues to be provided to some customers, but allow other customers to upgrade to a G.hn, or other suitable broadband protocol, at any time they wish.

A network device, in some implementations, is configured to support multiple wireline communication protocols such as an Ethernet protocol and an OFDM broadband protocol (e.g., ITU-T G.hn) on the same UTP cable, and select one of the protocols for use on the UTP cable at a given time. The network device performs a protocol determination algorithm to detect the protocol in use by its link partner, e.g., destination device, such that the appropriate protocol and protocol transceiver are selected and used on the cabling. In some implementations, the network device includes a circuit to allow sharing of circuitry among different protocol transceivers of a communication interface that is coupled with a destination device. For example, the Ethernet transformer can be shared between Ethernet and G.hn. Based on the different signal characteristics, such as voltage and impedance, between Ethernet and G.hn, sharing of the same Ethernet transformer is typically not straightforward due to potential interference between an Ethernet transceiver and a G.hn transceiver sharing said transformer. As such, in some implementations, the network device includes a mechanism to isolate, from a shared transformer, a transceiver that is not in use from a transceiver that is in use. In some implementations, such isolation is accomplished by placing the transceiver that is not in use in an power off or a high impedance state such that it is effectively decoupled. In some implementations, such isolation is accomplished by a multiplexer. In some implementations, the network device includes a circuit to preserve signal quality and impedance matching for the active protocol circuitry while the other protocol circuitry is in a power down mode. In some implementations, the network device enables a smooth upgrade path from older Fast Ethernet to newer 2 Gbps G.hn and beyond. In some implementations, the network device includes circuitry to extend the range of UTP cable installations beyond the 100 m of standard Ethernet.

In some implementations, the network device includes circuitry to communicate over a single wire pair (i.e., two wires) for both transmission and reception, instead of 2 or 4 pairs, to maximize the number of potential users in a Multiple Dwelling Unit (MDU) installation where the number of cable pairs may be limited by the maximum diameter of the bundle of cables. In some implementations, the network device includes circuitry to use two or more wire pairs in a MIMO mode to achieve higher throughput, e.g., up to N-by-N MIMO on a N-pair UTP cable, where N is an integer equal to or greater than two (e.g., 2, 4, 6, 7, 8, etc.)

FIG. 1 shows a block-level diagram of an example of a multi-protocol interface 101 of a network device for communications over a single wire pair. The interface 101 includes transceivers 110*a*, 110*b*, switch 120, and Ethernet transformer 125. In this example, the transceivers 110*a*-*b* include an Ethernet transceiver 110a and a G.hn transceiver 110b. In some implementations, the Ethernet transceiver 110a and the G.hn transceiver 110b are connected to the same wireline transmission medium, e.g., UTP cable, sharing the same Ethernet transformer 125 and the same port, e.g., UTP cable connector 135. In some implementations, the UTP cable connector 135 is an RJ-45 connector. The interface 101 is configured to determine a wireline communication protocol, e.g., Ethernet or G.hn or other protocol, in use by a destination device connected with the interface 101 and to select among the transceivers 110a-b based on the protocol in use by the destination device.

The switch 120 isolates the Ethernet transceiver 110a from the G.hn transceiver 110b when the G.hn transceiver 110b is in use. In some implementations, the switch 120 isolates the Ethernet transceiver 110a if the voltage swing of the G.hn signal causes protection diodes 113 of the Ethernet transceiver 110a to enter a conduction state. In some implementations, when the Ethernet transceiver 110a is active, the G.hn transceiver 110b is in a high impedance mode. In some implementations, when the G.hn transceiver 110b is active, the Ethernet transceiver 110a is in a power down mode.

The Ethernet transceiver 110a includes a transmit amplifier 115a and a receive amplifier 115b. The G.hn transceiver 110b includes a transmit amplifier 115c and a receive amplifier 115d. The transmit amplifier 115c of the G.hn transceiver 110b is coupled with the Ethernet transformer 125 via a transformer 130. In some implementations, the transformer 130 beneficially maximizes voltage swings for the G.hn system to achieve a longer transmission range.

In some implementations, the Ethernet transceiver 110a can include two or more transceivers for communications with a destination device via two or more separate pairs of wires. In some implementations, the two or more separate pairs of twisted wires are disposed in a same cable, such as a UTP cable, while in some other implementations the pairs of twisted wires are disposed in separate cables. In some implementations, the G.hn transceiver 110a includes two or more transceivers in respective analog front-end (AFEs) for communications via two or more pairs of wires. For example, G.hn can use one wire pair or two or more wire pairs depending if the operating mode is single-in, single-out (SISO) or MIMO, respectively.

Figure 2:
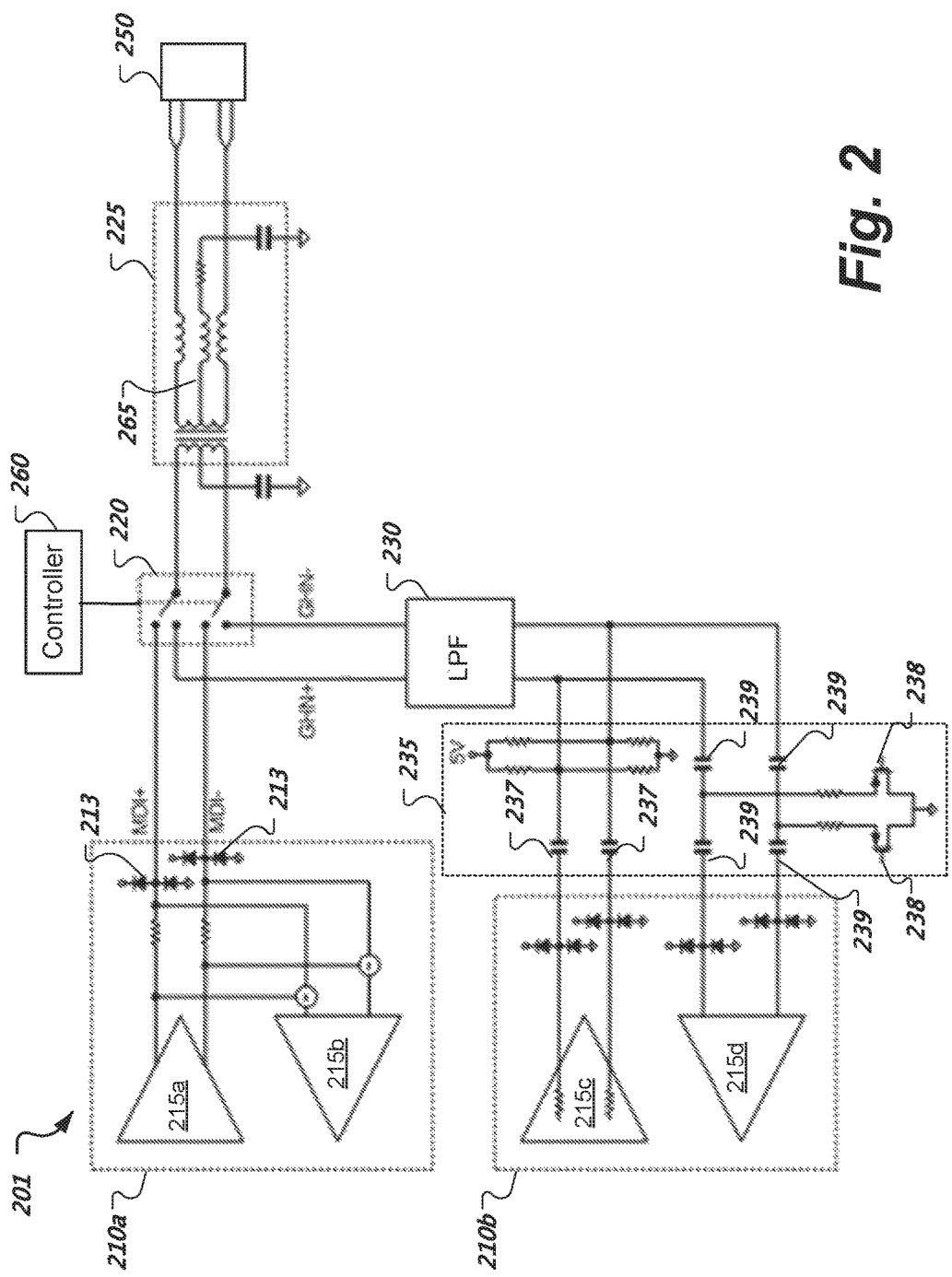
FIG. 2 shows a block-level diagram of another example of a multi-protocol interface of a network device for communications over a single wire pair.

FIG. 2 shows a block-level diagram of another example of a multi-protocol interface 201 of a network device for communications over a single wire pair. The interface 201 includes transceivers 210a, 210b, multiplexer 220, Ethernet transformer 225, low-pass filter (LPF) 230, coupling and biasing network 235, cable connector 250, and controller 260. The transceivers 210a-b include an Ethernet transceiver 210a and a G.hn transceiver 210b. The transceivers 210a-b are coupled with the multiplexer 220. The multiplexer 220 is coupled with the Ethernet transformer 225. The Ethernet transformer 225 is coupled with a port, e.g., the cable connector 250.

In some implementations, the Ethernet transceiver 210a includes a transmit amplifier 215a and a receive amplifier 215b. The output wires of the transmit amplifier 215a are coupled with the input wires of the receive amplifier 215b to enable transmitting and receiving communication signals over a single pair of wires (see MDI+ and MDI- labels in FIG. 2, where MDI is a medium dependent interface). In some implementations, the Ethernet transceiver 210a includes electrostatic discharge (ESD) protection diodes 213.

The G.hn transceiver 210b includes a transmit amplifier 215c and a receive amplifier 215d. The output wires of the G.hn transmit amplifier 215c are coupled with the input wires of the receive amplifier 215d to enable transmitting and receiving over a single pair of wires. A coupling and biasing network 235 is coupled among the transmit amplifier 215c, receive amplifier 215d, and the multiplexer 220. Within the coupling and biasing network 235, a pair of capacitors 237 are disposed on the output wires of the transmit amplifier 215c. Further, two pairs of capacitors 239 are disposed on the input wires of the receive amplifier 215d to perform alternate current (AC) coupling of the G.hn signal. Between the two pairs of capacitors 239, a pair of transistors 238 control current flow for impedance matching during reception. In some implementations, the G.hn transceiver 210b switches on or off the transistors 238 via one or more general purpose output (GPO) signals. In some implementations, G.hn circuitry is matched to a 100Ω differential. During transmission, the transmit amplifier 215c drives the line with an equivalent impedance of 100 ohm (depicted as resistors). In some implementations, the transistors 238 are open to avoid affecting impedance. During reception, the transmit amplifier 215c is in high impedance and the transistors 238 are closed, presenting a differential input impedance of 100Ω. In some implementations, the gates of the transistors 238 are controlled by a GPO pin of the G.hn transceiver 210b. The low-pass filter (LPF) 230 is coupled between the G.hn transceiver 210b and the multiplexer 220 to provide filtering.

Wireline communication protocols such as G.hn over Phone-line and Ethernet over Copper (EoC) supported by the interface 201 use differential voltage signals on 100Ω impedance. In addition, for example, such protocols use a similar amount of spectrum, e.g., Ethernet uses 125 MHz while G.hn uses up to 200 MHz, which is less than one octave more than Ethernet. As such, these protocols are able to share the same Ethernet transformer 225 without material side effects. Ethernet enhancements such as the 3-wire common-mode choke 265 can control radiated emissions and can also be beneficial for G.hn.

A major discrepancy between Ethernet and G.hn technologies supported by the interface 201 is voltage excursion. Ethernet uses a voltage of 2 Vpp differential and the absolute voltage is always positive, whereas G.hn uses up to an 8 Vpp differential and its absolute voltage is positive or negative. In some implementations, the Ethernet transceiver 210a cannot directly withstand the voltage level of a G.hn signal because its line interface is typically supplied from 3.3V and the ESD protection diodes 213 of the Ethernet transceiver 210a cause clipping on the G.hn signal. In addition, the Ethernet transceiver 210a presents an input impedance of 100Ω when in a power down mode. In some implementations, an analog multiplexer, such as multiplexer 220 is used to isolate the Ethernet transceiver 210a from the G.hn transceiver 210b. The multiplexer 220 has sufficient bandwidth and supply voltage to accommodate signals in accordance with its supported protocols (e.g., Ethernet and G.hn). Further, the multiplexer 220 has a low on resistance, e.g., less than 3Ω, and a low input capacitance, e.g., 6 pF or less.

In some implementations, the interface 201 includes a biasing network, which is used to set the common-mode voltage of the G.hn signal to 2.5V, which is in the middle of the voltage excursion allowed by the multiplexer 220. The G.hn signal may then exceed the supply rails of the multiplexer 220 by 0.3V, which is the threshold of the ESD diodes 213. Therefore the excursion is from -0.3V to 5.3V in absolute value or 11.2 Vpp differential. This value is sufficient to accommodate the maximum G.hn signal without clipping the OFDM peaks associated with the G.hn signal.

In some implementations, the ESD diodes 213 are located within the multiplexer 220, where the multiplexer 220 blocks the G.hn signal to prevent clipping in one or more diodes of the Ethernet transceiver 210a and allows for a lower voltage excursion.

Basic Ethernet is designed for indoor use with a surge level up to 1.5 kV. In some implementations, a network device interface is ruggedized to operate in harsher, outdoor environments in addition to indoor environments. For example, in some implementations, separate Ethernet transformer and RJ-45 connector are used, where the Ethernet transformer supports 4 kV or larger surge voltages. In some implementations, the interface 201 includes surge protections at the input port, such as a positive temperature coefficient (PTC) device and a gas discharge tube (GDT) as used in the G.hn interface for phone line. In some implementations, a connection to protective earth is used. In some implementations, the interface 201 includes a transient voltage suppression (TVS) device between differential pairs to clamp any residual differential-mode spike resulting from the common-mode disturbance. In some implementations, AC coupling is used between the Ethernet transformer and an RJ-45 connector to support coexistence with an analog phone network.

Figure 3:
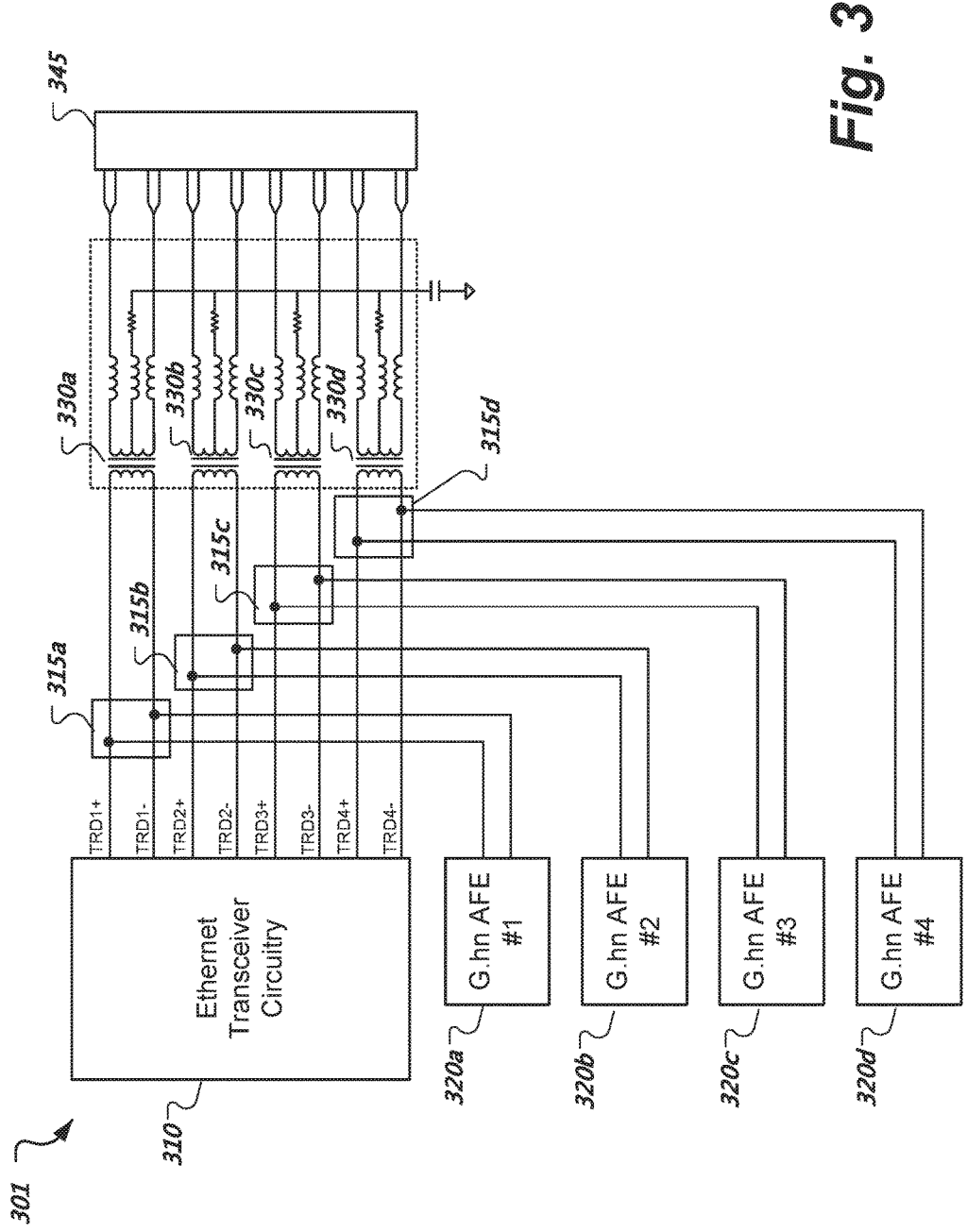
FIG. 3 shows a block-level diagram of a multi-protocol interface for multiple-input, multiple-output communications over multiple wire pairs.

FIG. 3 shows a block-level diagram of a multi-protocol interface 301 for multiple-input, multiple-output communications over multiple wire pairs. The interface 301 includes an Ethernet transceiver circuitry 310; G.hn AFEs 320a, 320b, 320c, 320d; junctions 315a, 315b, 315c, 315d; transformers 330a, 330b, 330c, and 330d, and a connector 345. In some implementations, the Ethernet transceiver circuitry 310 includes one or more discrete semiconductors that are integrated. In some implementations, the G.hn AFEs 320a-d include one or more discrete semiconductors that are integrated. The transformers 330a-d are configured to transform incoming and outgoing signals. For example, in some implementations, the transformers 330a-d convert between different voltages. In some implementations, the transformers 330a-d filter unwanted signal components, provide isolation between different circuit domains, or both. The transformers 330a-d are coupled with the connector 345 to receive a cable such as an UTP cable. Each of the G.hn AFEs 320a-d can be referred to as a transceiver. In some implementations, the G.hn AFEs 320a-d provide low-level transceiver functionality, while a G.hn baseband processor provides high-level transceiver functionality. In some implementations, the Ethernet transceiver circuitry 310 includes four internal gigabit Ethernet transceivers for communications over four wire pairs (labelled TR1, TRD2, TRD3, and TRD4 with each having a "+" wire and a "−" wire). While FIG. 3 depicts four wire pairs for MIMO communication, more or less wire pairs can be used. For example, 2×2, 6×6, or 7×7 MIMO is possible. In some MIMO implementations, two or more levels of transformers are used to realize some MIMO combinations such as 6×6 or 7×7 MIMO.

Junctions 315a-d are formed between wire pairs associated with the G.hn AFEs 320a-d and wire pairs associated with the transceivers of the Ethernet transceiver circuitry 310. In some implementations, the junctions 315a-d include selectors, e.g., switches or multiplexers, to engage or disengage one or more of the transceivers of the Ethernet transceiver circuitry 310 and G.hn AFEs 320a-d. In some implementations, the interface 301 includes a controller (not shown) that determines a protocol used by a destination device connected with the connector 345 of the interface 301 via a cable such as UTP cable, which includes four or more wire pairs (each pair associated with a respective transformer of the transformers 330a-d). Once determined, the interface 301 can engage the transceivers, e.g., transceiver circuitry 310 or G.hn AFEs 320a-d, that correspond to the protocol used by the destination device.

Figure 4:
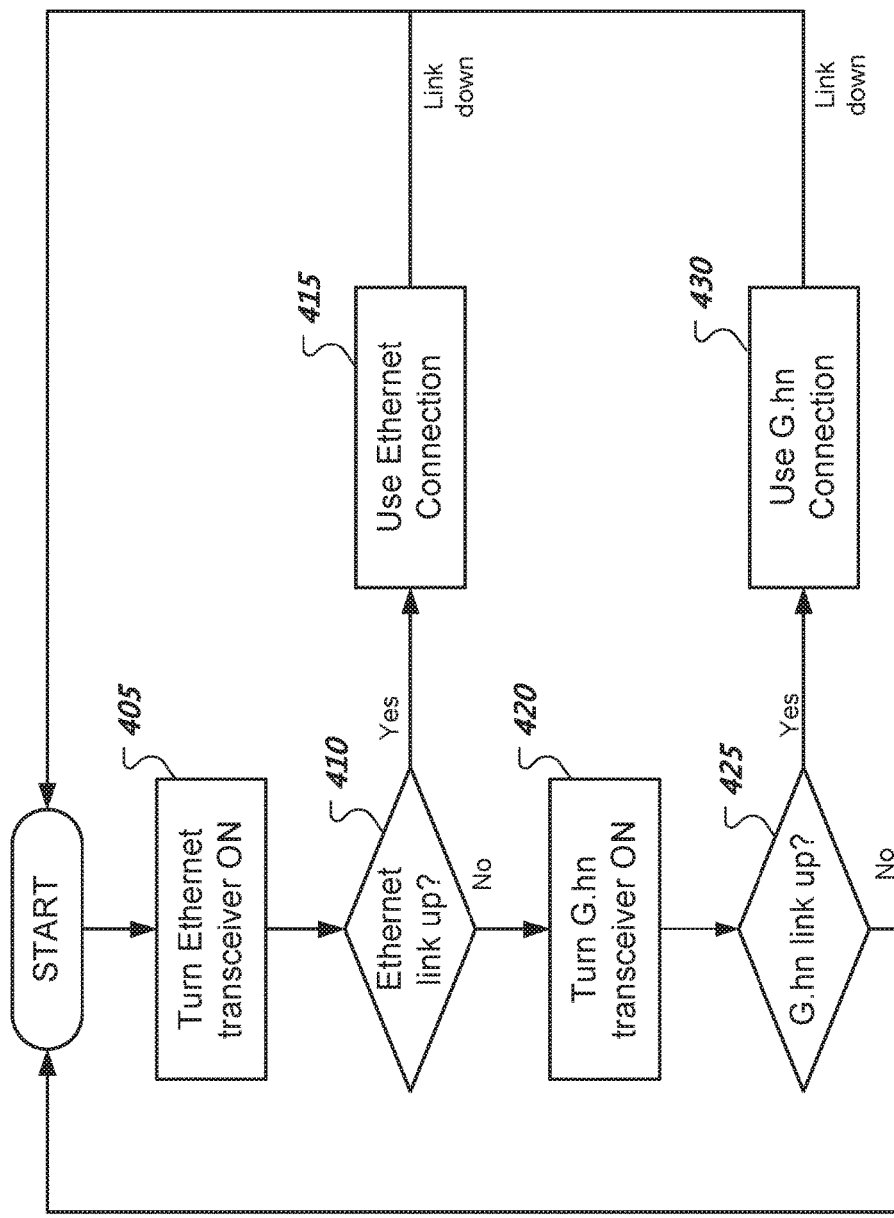
FIG. 4 shows a flowchart of an example of a connection process performed by a multi-protocol interface.

FIG. 4 shows a flowchart of an example of a connection process performed by a multi-protocol interface. In this example, the multi-protocol interface includes an Ethernet transceiver and a G.hn transceiver. At 405, the process turns on the Ethernet transceiver. In some implementations, the process causes the G.hn transceiver to be in a high impedance state to prevent interference with the Ethernet transceiver, where the high impedance state effectively decouples the G.hn transceiver from the Ethernet transceiver. In some implementations, the process causes a selector to engage the Ethernet transceiver with a transformer coupled with a wireline transmission medium. At 410, the process determines whether the Ethernet link is up. In some implementations, determining whether the Ethernet link is up includes performing one or more Ethernet negotiations for a predetermined amount of time. In some implementations, an Ethernet negotiation includes exchanging one or more low-level packets or signaling between endpoints. If the Ethernet link is up, the process uses Ethernet for communications at 415. In some implementations, if the Ethernet link subsequently goes down, the process resets the Ethernet transceiver and restarts the protocol determination process at 405.

If the Ethernet link is not up at 410, the process turns on the G.hn transceiver at 420. In some implementations, the process powers down the Ethernet transceiver to prevent interference with the G.hn transceiver. In some implementations, the process causes a selector to engage the G.hn transceiver with a transformer coupled with a wireline transmission medium, to disengage the Ethernet transceiver with a transformer, or both. At 425, the process determines whether the G.hn link is up. In some implementations, determining whether the G.hn link is up includes sending a G.hn based waveform and detecting a response. If the G.hn link is up, the process uses G.hn for communications at 430. In some implementations, if the G.hn link subsequently goes down, the process resets the G.hn transceiver and restarts the protocol determination process at 405.

Figure 5:
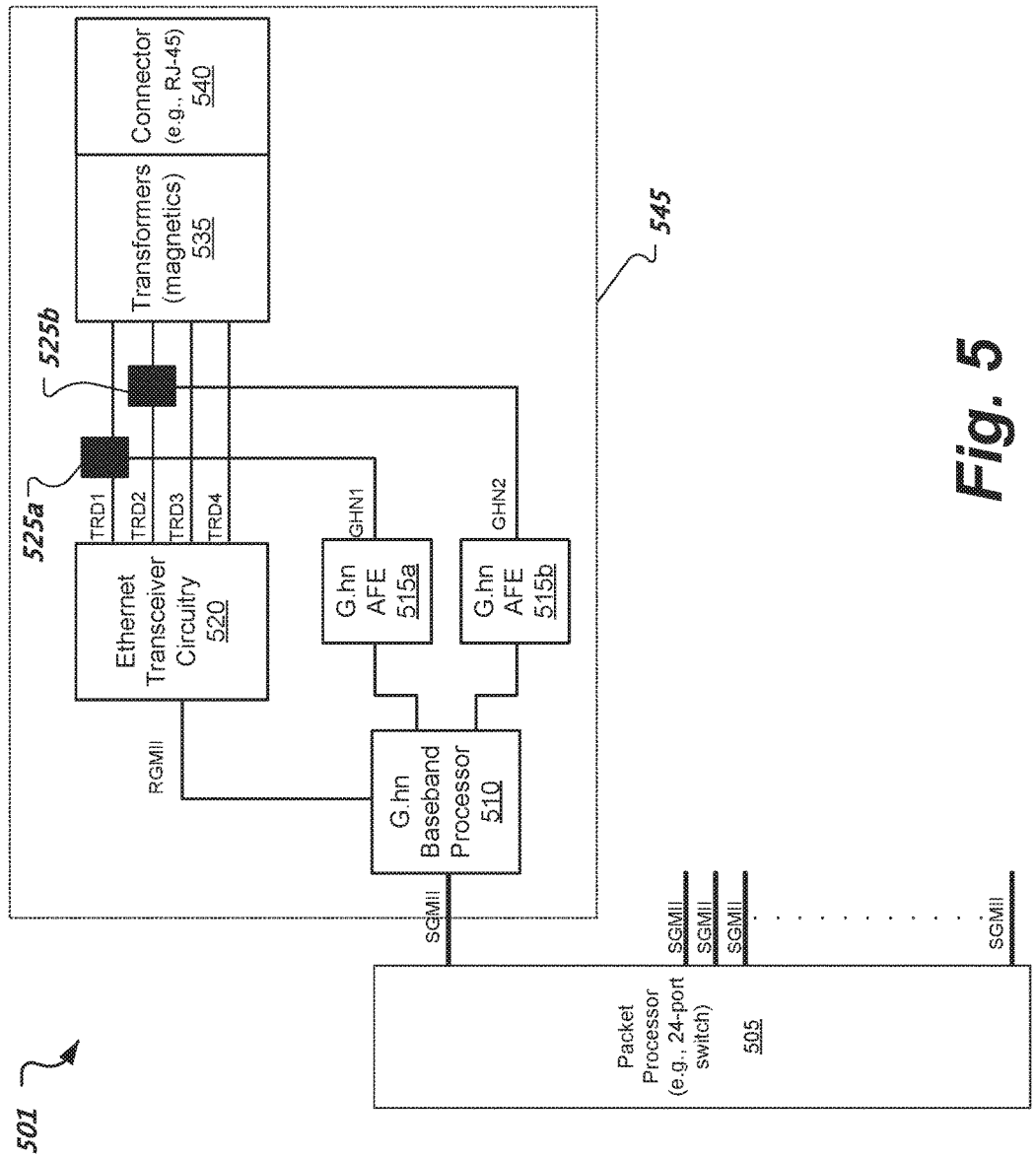
FIG. 5 shows a diagram of a network device that includes multiple interfaces that support a group of wireline communication protocols.

FIG. 5 shows a diagram of a network device 501 that includes multiple interfaces 545 that support a group of wireline communication protocols. The network device 501 includes a packet processor 505 that interconnects interfaces 545. While FIG. 5 provides a block-diagram of the internal structures of an interface 545, the network device 501 can include different types of interfaces. In some implementations, the network device 501 includes a fiber optic interface in addition to G.hn/Ethernet interfaces 545. In some implementations, the packet processor 505 includes a N-port switch with a 10GE backbone that is split into N connections. In some implementations, the interfaces 545 and the packet processor 505 are interconnected via Gigabit Media Independent Interface (SGMII) connections.

One or more of the interfaces 545 includes a G.hn baseband processor 510, G.hn AFEs 515a, 515b, Ethernet transceiver circuitry 520, junctions 525a, 525b, transformers 535, and a connector 540. In this example, the G.hn baseband processor 510 acts as the main packet processing engine for both the G.hn and Ethernet protocols. As shown, the G.hn baseband processor 510 sends packet data to and receives packet data from the Ethernet transceiver circuitry 520 via a Reduced gigabit media-independent interface (RGMII) connection.

The Ethernet transceiver circuitry 520 include four internal transceivers that communicate via four wire pairs (labelled TR1, TRD2, TRD3, and TRD4). The Ethernet transceiver circuitry 520 can support various Ethernet protocols such as EoC at 100BASE-T, 1000BASE-T, or NBASE-T. Other types of Ethernet protocols are possible. Further, other numbers of internal transceivers are possible. In some implementations, the Ethernet transceiver circuitry 520 is a standalone Ethernet transceiver chip.

The G.hn baseband processor 510 supports G.hn 2×2 MIMO via the two G.hn AFEs 515a-b. In some implementations, the G.hn baseband processor 510 prepares one or more OFDM signals in the digital domain, and the G.hn AFEs 515a-b convert the digital OFDM signals into analog signals for transmission. Each of the G.hn AFEs 515a-b can be referred to as a transceiver. In some implementations, the G.hn AFEs 515a-b provide low-level transceiver functionality such as filtering, analog to digital conversion, and digital to analog conversion, while the G.hn baseband processor 510 provides high-level transceiver functionality such as medium access control, digital OFDM waveform generation, or both. In some implementations, the G.hn baseband processor 510 outputs analog signals so that the G.hn AFEs 515a-b are not required to perform digital to analog conversion. In some implementations, the G.hn AFEs 515a-b are included in one or more integrated circuit (IC) chips. In some implementations, the G.hn baseband processor 510 is a standalone baseband processor chip.

The Ethernet transceiver circuitry 520 and the G.hn AFEs 515a-b are coupled with the transformers 535. The transformers 535 include an Ethernet transformer for each of the four wire pairs (TR1, TRD2, TRD3, and TRD4). A connector 540, such as an RJ-45 jack, is coupled with the transformers 535 for transmitting and receiving signals via a cable such as a category 5 cable or higher, which includes four twisted wire pairs.

The wire pairs associated with two transceivers of the Ethernet transceiver circuitry 520 and wire pairs associated with the G.hn AFEs 515a-b are joined at junctions 525a-b. In some implementations, the junctions 525a-b include selectors, e.g., switches or multiplexers. In some implementations, a controller such as the G.hn baseband processor 510 controls the selectors based on what protocol (e.g., Ethernet or G.hn) is used by a destination device connected with the interface 545 via the connector 540.

Figure 6:
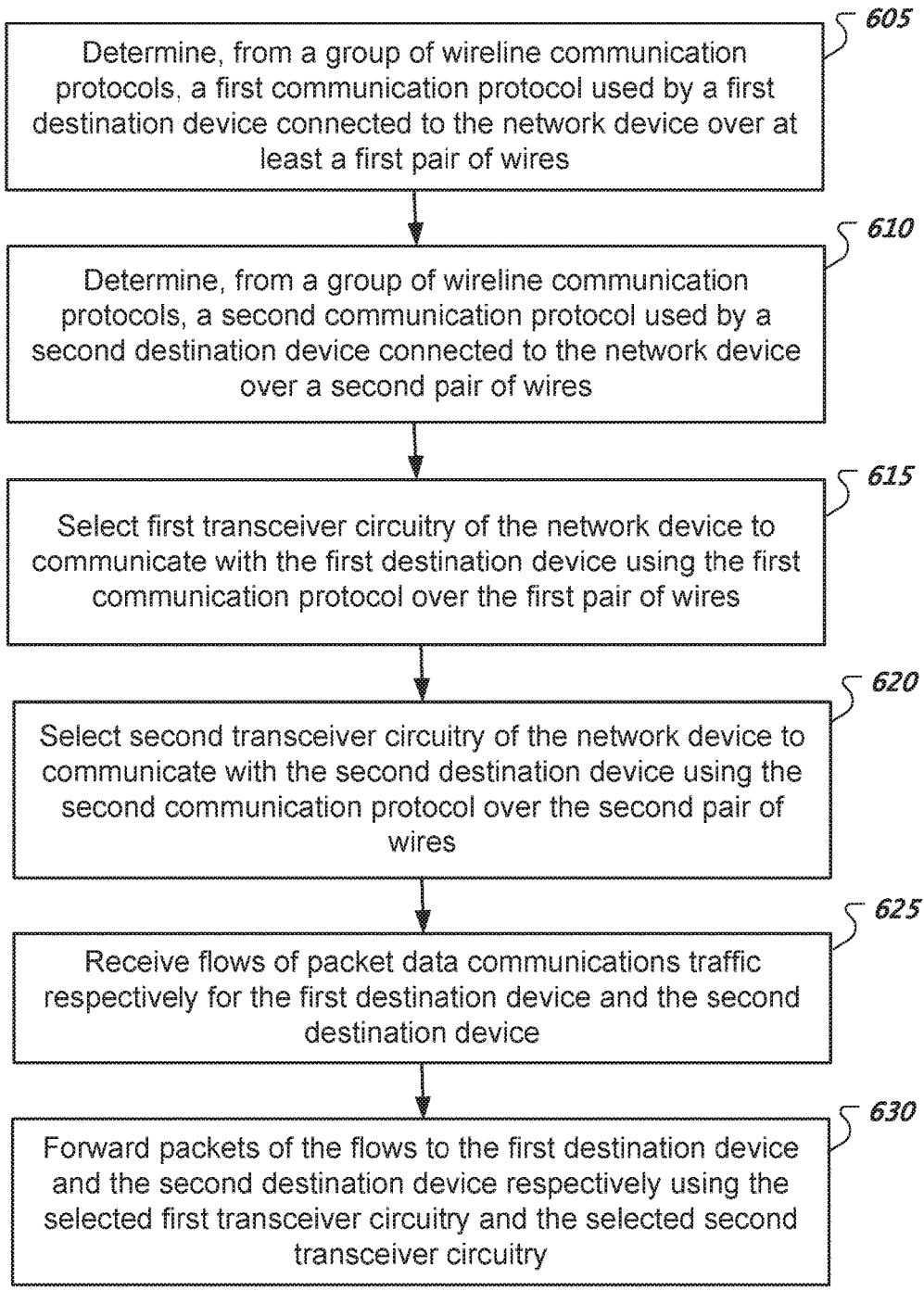
FIG. 6 shows a flowchart of an example of a process performed by a multi-protocol network device that is capable of allowing destination devices to selectively upgrade to a newer wireless communication protocol.

FIG. 6 shows a flowchart of an example of a process performed by a multi-protocol network device that is capable of allowing destination devices to selectively upgrade to a newer wireless communication protocol. The multi-protocol network device, is some implementations, is capable of allowing destination devices to be selectively upgraded from an Ethernet protocol to a newer wireless communication protocol such as, for example, a suitable OFDM broadband protocol. At 605, the process determines from a group of wireline communication protocols a first communication protocol used by a first destination device connected to the network device over at least a first pair of wires. In some implementations, the group of communication protocols includes an Ethernet protocol and a non-Ethernet protocol such as an OFDM broadband protocol, e.g., G.hn protocol. In some implementations, determining the communication protocol includes using a process such as the one depicted by FIG. 4. In some implementations, the process includes causing an Ethernet transceiver to attempt to communicate with a destination device via the Ethernet protocol for a first predetermined amount of time; and selectively causing, if unsuccessful during the first predetermined amount of time, an OFDM broadband protocol based transceiver to attempt to communicate with the respective destination device via the OFDM broadband protocol for a second predetermined amount of time. In some implementations, the process detects a number of the two or more pairs of wires that are used by the destination device and determines the protocol used by the respective destination device based on the number. For example, a protocol may support only two wire pairs for communications to a single destination, thus if more than two pairs are in use (e.g., signals are detected) by the destination device, such a protocol is excluded from further consideration in determining the protocol. In some implementations, the process performs one or more measurements, e.g., impedance, resistance, voltage, etc., on a wire pair to determine a protocol used by the respective destination device. At 610, the process determines, from the group of wireline communication protocols, a second communication protocol used by a second destination device connected to the network device over a second pair of wires. The determined first and second communication protocols can be different protocols.

At 615, the process selects first transceiver circuitry of the network device to communicate with the first destination device using the first communication protocol over the first pair of wires. In some implementations, selecting first transceiver circuitry includes operating a selector such as a switch or a multiplexer to couple a transceiver that is capable of supporting the first communication protocol to a transformer of an interface coupled with the first destination device. In some implementations, the process powers down one or more transceivers that are not required to communicate with the first destination device. In some implementations, the process places one or more transceivers that are not required to communicate with the first destination device in a high impedance state.

At 620, the process selects second transceiver circuitry of the network device to communicate with the second destination device using the second communication protocol over the second pair of wires. In some implementations, selecting second transceiver circuitry includes operating a selector such as a switch or a multiplexer to couple a transceiver that is capable of supporting the second communication protocol to a transformer of an interface coupled with the second destination device. In some implementations, the process powers down one or more transceivers that are not required to communicate with the second destination device. In some implementations, the process places one or more transceivers that are not required to communicate with the second destination device in a high impedance state.

At 625, the process receives flows of packet data communications traffic respectively for the first destination device and the second destination device. In some implementations, receiving flows of packet data communications traffic includes receiving data from a backhaul interface such as a fiber optic interface. At 630, the process forwards packets of the flows to the first destination device and the second destination device respectively using the selected first transceiver circuitry and the selected second transceiver circuitry.

Figure 7:
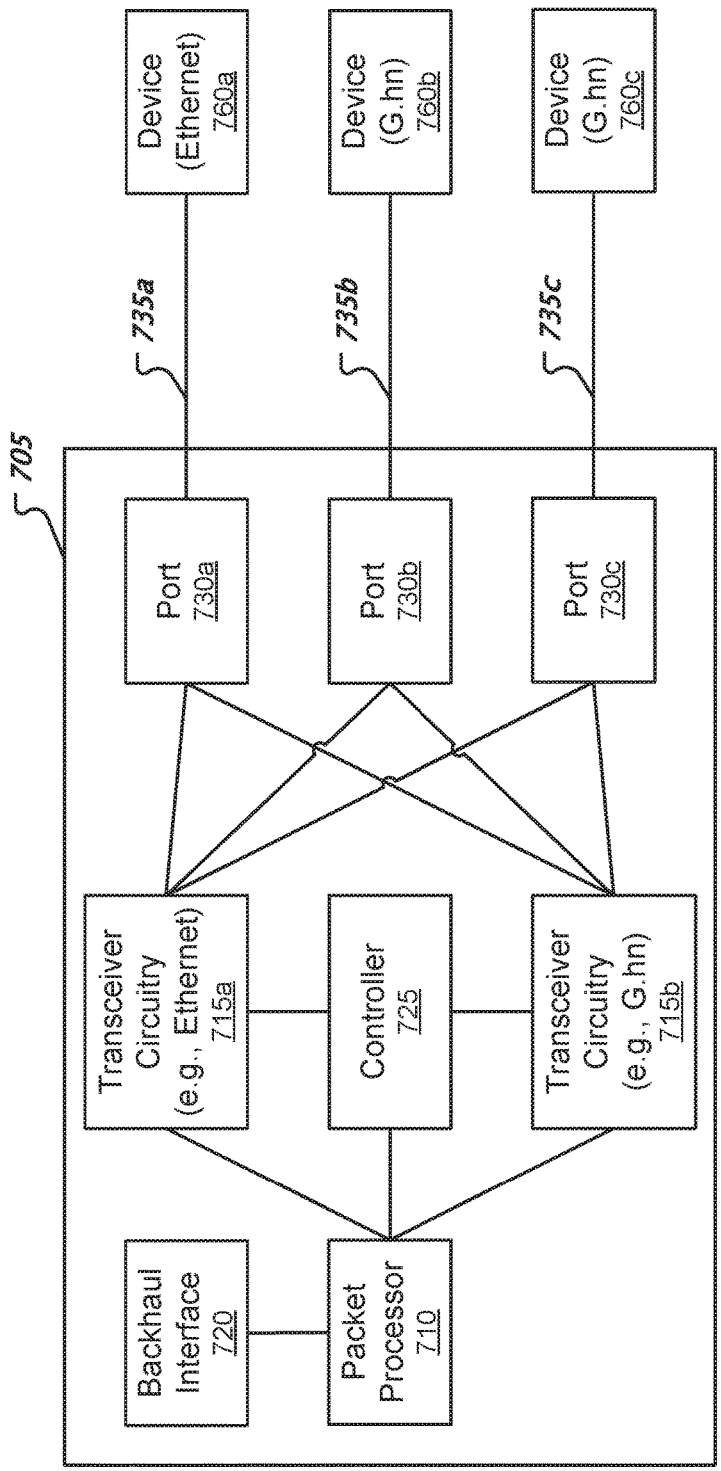
FIG. 7 shows a block diagram of an example of a system including a network device and destination devices.

FIG. 7 shows a block diagram of an example of a system including a network device 705 and destination devices 760a, 760b, 760c. The network device 705 includes a packet processor 710, backhaul interface 720, transceiver circuitry 715a, transceiver circuitry 715b, controller 725, and ports 730a, 730b, 730c. The packet processor 710 is configured to forward packets among the backhaul interface 720 and the transceiver circuitries 715a-b which are coupled with ports 730a-c. The destination devices 760a-c are coupled with respective ports 730a-c via respective wire pairs 735a, 735b, 735c. In this example, single wire pairs 735a-c are coupled between a port 735a-c and a destination device 760a-c. However, in some implementations, two or more wire pairs are coupled between a port 735a-c and a destination device 760a-c. In some implementations, each of the wire pairs 735a-c are disposed within an UTP cable. In some implementations, two or more of the wire pairs 735a-c are bundled within a single UTP cable.

Transceiver circuitry 715a supports a legacy wireline communication protocol such as Ethernet, whereas transceiver circuitry 715b supports a newer wireline communication protocol such as G.hn. In some implementations, transceiver circuitry 715a includes Ethernet transceivers corresponding to each of the ports 730a-c. In some implementations, transceiver circuitry 715b includes G.hn transceivers corresponding to each of the ports 730a-c.

Each of the ports 730a-c in network device 705 supports a group of wireline communication protocols such that owners of the destination devices 760a-c can readily upgrade their devices, for example, from a legacy Ethernet protocol to a newer OFDM based protocol whenever they want without any hardware changes at the network device 705 and without reinstallation of a new UTP cable infrastructure. Hence, the controller 725 is configured to determine a wireline protocol used by each of the destination devices 760a-c. In some implementations, the controller 725 is configured to determine a wireline protocol used by a destination device 760a-c by controlling transceiver circuitry 715a to attempt an Ethernet-based handshake (e.g., an exchange of signals using an Ethernet protocol) with the destination device 760a-c for a predetermined amount of time, and if unsuccessful, controlling transceiver circuitry 715b for a subsequent predetermined amount of time, to attempt a non-Ethernet-based handshake (e.g., an exchange of signals using a non-Ethernet protocol) with the destination device 760a-c.

A potential advantage of device 705 is that it enables the use of an already existing UTP cable infrastructure and avoids the need to rewire a network when upgrading from Ethernet to OFDM broadband protocol such as G.hn. By including selectable transceivers 715a-b for Ethernet and OFDM broadband respectively, the device 705 facilitates upgrading some networks from all Ethernet to mixed Ethernet/G.hn by replacing an old Ethernet-only network device with the network device 705 depicted by FIG. 7, and reconnecting twisted pairs already present in existing UTP cabling. As such, rewiring of an entire building is obviated.

In some implementations, a technique for managing a network device includes determining, at a first interface of a network device, a first protocol of a group of protocols that is in use by a first destination device, wherein the group of protocols comprises an Ethernet protocol and an OFDM broadband protocol; and determining, at a second interface of the network device, a second protocol of the group of protocols that is in use by a second destination device. The technique includes operating a first selector of the first interface of the network device to select among first transceivers of the first interface based on the determined first protocol, the first transceivers including a transceiver for communications via the Ethernet protocol and a transceiver for communications via the OFDM broadband protocol, the first selector being coupled with the first transceivers and a first transformer, the first transformer being coupled with the first destination device via a first wireline transmission medium. The first selector is configured to isolate one or more of the first transceivers when not selected from the first transformer. The technique includes operating a second selector of the second interface of the network device to select among second transceivers of the second interface based on the determined second protocol, the second transceivers including a transceiver for communications via the Ethernet protocol and a transceiver for communications via the OFDM broadband protocol, the second selector being coupled with the second transceivers and a second transformer, the second transformer being coupled with the second destination device via a second wireline transmission medium. The second selector is configured to isolate one or more of the second transceivers when not selected from the second transformer. The technique includes routing, at the network device, packets among interfaces including the first interface and the second interface.

In some implementations, an interface of a network device includes transceivers which contain an Ethernet transceiver including a pair of wires and a G.hn transceiver including a pair of wires; a transformer including a first pair of wires and a second pair of wires, the second pair of wires being connectable with a wireline transmission medium; a selector coupled with the pair of wires of the Ethernet transceiver, the pair of wires of the G.hn transceiver, and the first pair of wires of the transformer; and a controller coupled with the selector. In some implementations, the controller is configured to determine a protocol in use on the wireline transmission medium and to select among the transceivers based on the protocol in use on the wireline transmission medium. In some implementations, the controller is configured to cause the selector to isolate the Ethernet transceiver from the transformer if the G.hn transceiver is selected to communicate via the wireline transmission medium.

In some implementations, the interface's selector includes a multiplexer, the pair of wires of the Ethernet transceiver are coupled with a first input of the multiplexer, the pair of wires of the G.hn transceiver are coupled with a second input of the multiplexer, the multiplexer is coupled with the transformer, and the controller causes the multiplexer to select between the first input and the second input based on a selected mode.

In some implementations, the interface's selector includes a switch, the switch is coupled between the pair of wires of the Ethernet transceiver and the first pair of wires of the transformer, the pair of wires of the G.hn transceiver is coupled between the switch and the transformer, and the controller is configured to cause the switch to isolate the Ethernet transceiver from the transformer if the G.hn transceiver is selected to communicate via the wireline transmission medium. In some implementations, the G.hn transceiver includes a transmit amplifier and a receive amplifier, communication output wires of the transmit amplifier are coupled with the pair of wires of the G.hn transceiver via a transformer, and communication input wires of the receive amplifier are coupled with the pair of wires of the G.hn transceiver.

In some implementations, the interface of the network device is configured for MIMO communications. In some implementations, the Ethernet transceiver is a first Ethernet transceiver, the G.hn transceiver is a first G.hn transceiver, wherein the transformer is a first transformer, the selector is a first selector, the wireline transmission medium is a first wireline transmission medium, and wherein the network device further includes a second Ethernet transceiver including a pair of wires; a second G.hn transceiver including a pair of wires; a second transformer including a first pair of wires and a second pair of wires, the second pair of wires being connectable with a second wireline transmission medium; and a second selector coupled with the pair of wires of the second Ethernet transceiver, the pair of wires of the second G.hn transceiver, and the first pair of wires of the second transformer. In some implementations, the controller is configured to cause the second selector to isolate the second Ethernet transceiver from the second transformer if the second G.hn transceiver is communicating via the second wireline transmission medium. In some implementations, the first wireline transmission medium and the second wireline transmission medium are carried by two or more wire pairs within an UTP cable.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A network device, comprising:
   ports to connect with destination devices over wireline transmission mediums, the wireline transmission mediums respectively comprising at least one pair of wires for transmitting and receiving data;
   a packet processor configured to forward packets to and from the ports;
   first transceiver circuitry configured to communicate using an Ethernet protocol over at least a portion of the wireline transmission mediums;
   second transceiver circuitry configured to communicate using an orthogonal frequency-division multiplexing (OFDM) broadband protocol over at least a portion of the wireline transmission mediums; and
   a controller configured to (i) determine, from a group of protocols comprising the Ethernet protocol and the OFDM broadband protocol, a protocol used by a respective destination device of the destination devices connected with the network device over a respective wireline transmission medium of the wireline transmission mediums and (ii) for communications with the respective destination device, select the first transceiver circuitry if the Ethernet protocol is the protocol used by the respective destination device or select the second transceiver circuitry if the OFDM broadband protocol is the protocol used by the respective destination device.

2. The network device of claim 1, comprising:
   a transformer coupled with a respective port of the ports, the transformer being configured to transform incoming and outgoing signals for a first transceiver of the first transceiver circuitry and a second transceiver of the second transceiver circuitry; and
   a multiplexer coupled with the first transceiver, the second transceiver, and the transformer,
   wherein the controller causes the multiplexer to select between the first transceiver and the second transceiver based on the protocol used by the respective destination device for communications via the respective port.

3. The network device of claim 2, wherein the respective port comprises a connector to receive an Unshielded Twisted Pair (UTP) cable.

4. The network device of claim 1, comprising:
   a transformer coupled with a respective port of the ports, the transformer being configured to transform incoming and outgoing signals for a first transceiver of the first transceiver circuitry and a second transceiver of the second transceiver circuitry; and
   a switch coupled between the first transceiver and the transformer,
   wherein the second transceiver is coupled between the switch and the transformer, and
   wherein the controller is configured to cause the switch to isolate the first transceiver from the transformer if the second transceiver is selected to communicate with the respective destination device.

5. The network device of claim 1, wherein the respective wireline transmission medium comprises two or more pairs of wires, wherein the first transceiver circuitry comprises two or more first transceivers configured to communicate respectively via the two or more pairs of wires of the respective wireline transmission medium, and wherein the second transceiver circuitry comprises two or more second transceivers configured to communicate respectively via the two or more pairs of wires of the respective wireline transmission medium.

6. The network device of claim 5, comprising:
   a connector to receive an Unshielded Twisted Pair (UTP) cable, wherein at least a portion of the two or more pairs of wires are bundled in the UTP cable.

7. The network device of claim 1, wherein the controller is configured to detect that multiple pairs of wires are used by the respective destination device and to determine that the OFDM broadband protocol is the protocol used by the respective destination device based on a detection that multiple pairs of wires are used by the respective destination device.

8. The network device of claim 1, wherein the controller is configured to determine the protocol used by the respective destination device by causing the first transceiver circuitry to attempt to communicate with the respective destination device via the Ethernet protocol for a first predetermined amount of time and subsequently use the Ethernet protocol if an Ethernet negotiation was successful during the first predetermined amount of time.

9. The network device of claim 8, wherein the controller is configured to determine the protocol used by the respective destination device by causing the second transceiver circuitry to attempt to communicate with the respective destination device via the OFDM broadband protocol for a second predetermined amount of time and subsequently use the OFDM broadband protocol if a communication was successful during the second predetermined amount of time.

10. The network device of claim 1, wherein the controller is configured to cause at least a portion of the first transceiver circuitry to enter a power down mode if the second transceiver circuitry is selected to communicate with the respective destination device via the respective wireline transmission medium, and wherein the controller is configured to cause at least a portion of the second transceiver circuitry to enter a high impedance state if the first transceiver circuitry is selected to communicate via the respective wireline transmission medium.

11. A method for wireline communications, the method comprising:
    causing a packet processor of a network device to forward packets to and from ports of the network device, the ports being connectable with destination devices over wireline transmission mediums, the wireline transmission mediums respectively comprising at least one pair of wires for transmitting and receiving data;
    operating first transceiver circuitry of the network device to communicate using an Ethernet protocol over at least a portion of the wireline transmission mediums and second transceiver circuitry of the network device to communicate using an orthogonal frequency-division multiplexing (OFDM) broadband protocol over at least a portion of the wireline transmission mediums;
    determining, from a group of wireline communication protocols, a protocol used by a respective destination device of the destination devices connected with the network device over a respective wireline transmission medium of the wireline transmission mediums, wherein the group of communication protocols includes the Ethernet protocol and the OFDM broadband protocol; and
    selecting for communications with the respective destination device i) the first transceiver circuitry when the Ethernet protocol is the protocol used by the respective destination device or ii) the second transceiver circuitry when the OFDM broadband protocol is the protocol used by the respective destination device.

12. The method of claim 11, comprising:
    operating an interface that comprises a respective port of the ports, a first transceiver of the first transceiver circuitry, a second transceiver of the second transceiver circuitry, a transformer that is coupled with the respective port, and a multiplexer coupled with the first transceiver, the second transceiver, and the transformer, wherein the transformer is configured to transform incoming and outgoing signals for the first transceiver and the second transceiver, and
    wherein operating the interface comprises causing the multiplexer to select between the first transceiver and the second transceiver based on the protocol used by the respective destination device.

13. The method of claim 11, comprising:
    operating an interface that comprises a respective port of the ports, a first transceiver of the first transceiver circuitry, a second transceiver of the second transceiver circuitry, a transformer that is coupled with the respective port, and a switch coupled between the first transceiver and the transformer, wherein the second transceiver is coupled between the switch and the transformer, wherein the transformer is configured to transform incoming and outgoing signals for the first transceiver and the second transceiver, and
    wherein operating the interface comprises causing the switch to isolate the first transceiver from the transformer if the second transceiver is selected to communicate with the respective destination device.

14. The method of claim 11, wherein the respective wireline transmission medium comprises two or more pairs of wires, wherein the first transceiver circuitry comprises two or more first transceivers configured to communicate respectively via the two or more pairs of wires of the respective wireline transmission medium, wherein the second transceiver circuitry comprises two or more second transceivers configured to communicate respectively via the two or more pairs of wires of the respective wireline transmission medium, wherein the method comprises using the two or more pairs of wires to communicate with the respective destination device.

15. The method of claim 11, wherein determining the protocol comprises:
    determining that the OFDM broadband protocol is the protocol used by the respective destination device based on a detection that multiple pairs of wires are used by the respective destination device.

16. The method of claim 11, wherein determining the protocol comprises:
    causing the first transceiver circuitry to attempt to communicate with the respective destination device via the Ethernet protocol for a first predetermined amount of time; and
    determining a success of an Ethernet negotiation during the first predetermined amount of time.

17. The method of claim 16, wherein determining the protocol comprises:
    causing the second transceiver circuitry to attempt to communicate with the respective destination device via the OFDM broadband protocol for a second predetermined amount of time; and
    determining a success of a negotiation during the second predetermined amount of time.

18. The method of claim 11, comprising:
    selectively causing at least a portion of the first transceiver circuitry to enter a power down mode if the second transceiver circuitry is selected to communicate with the respective destination device via the respective wireline transmission medium; and
    selectively causing at least a portion of the second transceiver circuitry to enter a high impedance state if the first transceiver circuitry is selected to communicate via the respective wireline transmission medium.

19. A method for upgrading a network to support at least two different wireline communication protocols, comprising:
    communicatively coupling a network device to two or more destination devices that are respectively configured to communicate using at least an Ethernet communication protocol or a non-Ethernet communication protocol;
    determining, at the network device, from a group of wireline communication protocols a first communication protocol used by a first destination device connected to the network device over a first pair of wires, wherein the group of wireline communication protocols includes the Ethernet communication protocol and the non-Ethernet communication protocol, wherein the first communication protocol is the Ethernet communication protocol;

determining, at the network device, from the group of wireline communication protocols a second communication protocol used by a second destination device connected to the network device over a second pair of wires, wherein the second communication protocol is the non-Ethernet communication protocol;

selecting first transceiver circuitry of the network device to communicate with the first destination device using the first communication protocol over the first pair of wires;

selecting second transceiver circuitry of the network device to communicate with the second destination device using the second communication protocol over the second pair of wires;

receiving, at the network device, flows of packet data communications traffic respectively for the first destination device and the second destination device; and forwarding packets of the flows to the first destination device and the second destination device respectively using the selected first transceiver circuitry and the selected second transceiver circuitry.

20. The method of claim 19, wherein the first pair of wires are bundled in a first Unshielded Twisted Pair (UTP) cable, wherein the second pair of wires are bundled in a second UTP cable, wherein forwarding the packets comprises transmitting a first packet of the packets to the first destination device via the first UTP cable, and wherein forwarding the packets comprises transmitting a second packet of the packets to the second destination device via the second UTP cable.

21. The method of claim 19, wherein the first pair of wires are bundled in a Unshielded Twisted Pair (UTP) cable, wherein the second pair of wires are bundled in the UTP cable, wherein forwarding the packets comprises transmitting a first packet of the packets to the first destination device via the first pair of wires in the UTP cable, and wherein forwarding the packets comprises transmitting a second packet of the packets to the second destination device via the second pair of wires in the UTP cable.

* * * * *